United States Patent

Garrett

[15] 3,688,573
[45] Sept. 5, 1972

[54] MEANS FOR DETERMINING FLOW RATE AND VOLUME OF A FLOWING FLUID MASS

[72] Inventor: Sheyrl W. Garrett, Tulsa, Okla.
[73] Assignee: Combustion Engineering, Inc., New York, N.Y.
[22] Filed: Nov. 12, 1970
[21] Appl. No.: 88,656

[52] U.S. Cl. ................................. 73/194 R, 73/233
[51] Int. Cl. ............................................... G01f 1/00
[58] Field of Search ............... 73/194, 205, 229–231, 73/233; 235/151.34

[56] References Cited

UNITED STATES PATENTS

| | | | |
|---|---|---|---|
| 3,176,514 | 4/1965 | Foster | 73/229 |
| 3,425,274 | 2/1969 | Clement et al. | 73/194 |
| 3,537,312 | 11/1970 | Moore | 73/231 |

Primary Examiner—Richard C. Queisser
Assistant Examiner—Herbert Goldstein
Attorney—Arthur L. Wade

[57] ABSTRACT

A system is disclosed which includes a flow meter producing voltage pulses of a frequency proportional to the flow rate of a flowing mass, and a sensing element responsive to a physical condition of the flowing mass with circuitry which produces a D.C. voltage signal analogous to that condition. A generator provides linear sawtooth voltage pulses against which a comparator circuit compares the analog voltage from the sensing element and circuit. The voltage resultant of the comparison passes a portion of the voltage pulses from the flow meter to a divider circuit element and a subtractor circuit element of the system for conversion of relatively low order changes in the physical condition to an expanded range equivalent, and for correction of the flow rate or volume as a function of such changes. The flow rate or volume as thus corrected is registered on a suitable flow rate indicator or volume counter.

5 Claims, 1 Drawing Figure

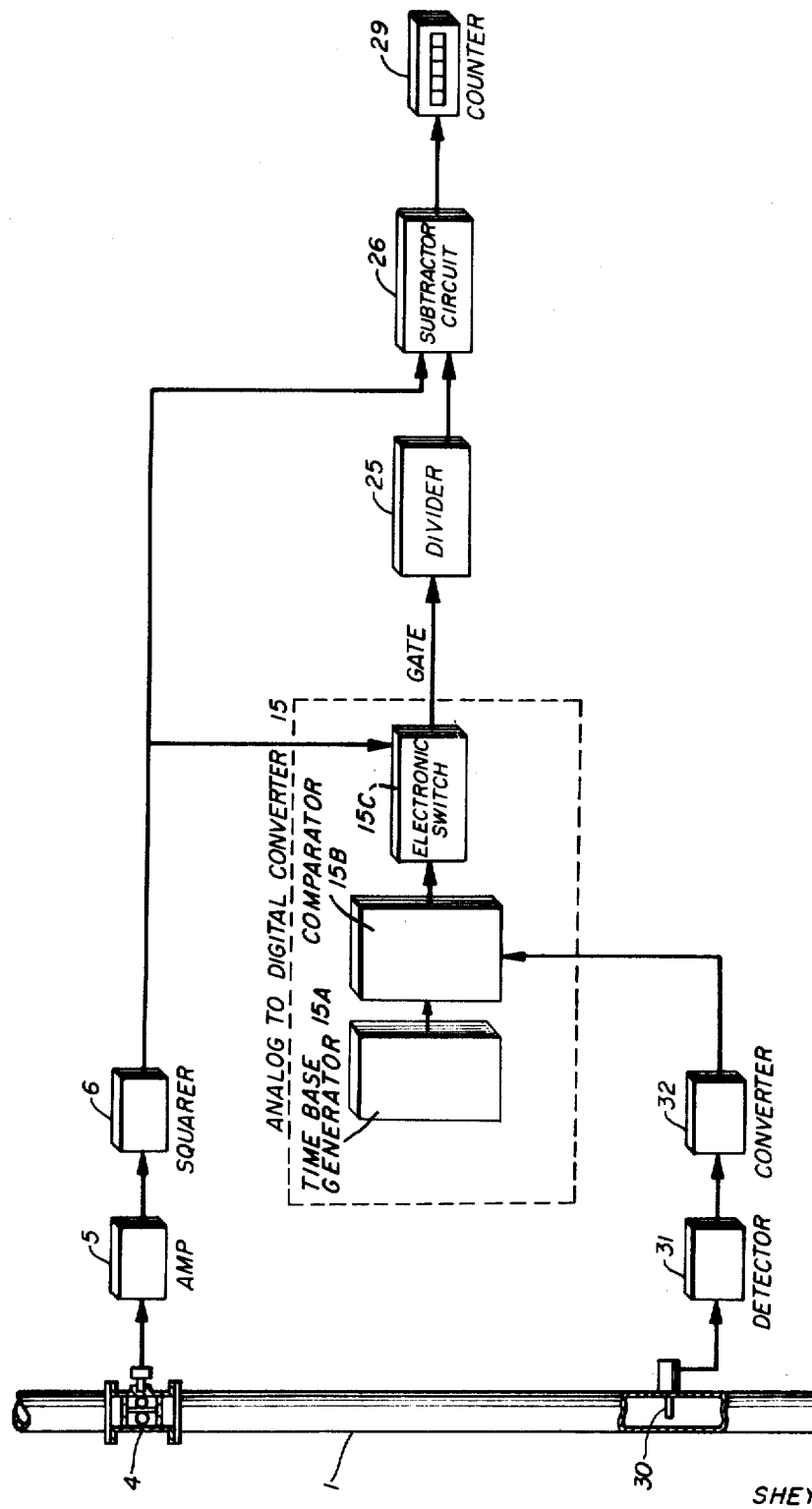

3,688,573

MEANS FOR DETERMINING FLOW RATE AND VOLUME OF A FLOWING FLUID MASS

BACKGROUND OF THE INVENTION

1. Field of the Invention

This invention relates to electronic measurement of a physical condition of a flowing fluid to accomplish corrections that are required in flow rate or flow quantity measurements as a result of such changes. More particularly, the invention relates to the switching, or gating, of voltage pulses generated by a flow meter by means of an analog voltage signal proportional over the signal's full range to only a small portion of the condition's possible full range; the pulses so gated are applied at a divider circuit to convert the pulses to a full range equivalent, and the pulses gated and divided are subtracted from the total pulses to correct the measurement of flow rate or quantity before registration on a flow rate indicator or flow volume counter.

2. Description of the Prior Art

It is known to make flow rate and quantity measurements, as well as measurements of various physical properties of materials, by sensing elements in contact with the materials. It is also known to measure flow rate and/or quantity of flowing fluids by producing voltage pulses of a frequency proportional thereto, and it is known to convert the sensing of physical properties of the flowing mass, such as temperature, pressure, and ratio of fluids in a fluid mixture, to analog D.C. voltages.

Furthermore, it is known from the disclosure of U.S. Pat. No. 3,385,108 to pass, or gate, a quantity of the voltage pulses which are proportional to flow in response to the level of the analog which is proportional to a physical condition of the flowing mass by means of a three component converter device comprised of a fixed-time-base linear sawtooth voltage generator, a comparator circuit which compares the analog to the sawtooth and produces a voltage dependent upon such comparison, and a switch means responsive to the comparator voltage output which resulted from the comparison. The switch means in response to the comparator output then gates some portion of the voltage pulses to means which manifest certain conditions of the flowing mass, such as flow rates and/or volumes.

It has long been a problem, however, to obtain an accurate measurement of these physical characteristics when the actual change of the physical characteristic is of a low order relative to its total possible change. For example, if the ratio of fluid dielectrics in a flowing fluid mixture is desired to be known, or if one or more of the flow rates or quantities of the fluids in the mixture is desired, but the actual variation of the ratio of fluids is relatively small with respect to the possible variation, it has not been possible with the pulse-analog comparison and gating system of U.S. Pat. No. 3,385,108 to obtain accurate measurements. Or, for example, where corrections in volume are necessary to compensate for the effect of temperature and/or pressure variations in a flowing fluid stream where actual volumetric variations are small with respect to total possible variation (as where volume change in a given system actually is only ±2 percent, but where theoretical volume changes on the order of, for example, ±4 percent are possible), the inherent error in the prior art system conceived to measure all possible variations renders the corrections unreliable for the given system where only very small changes occur. For example, in the system of U.S. Pat. No. 3,385,108, if only a small segment of the total ramp length (approximately 10 percent or less) is continuously utilized in the comparison with the analog, it is known that an inherent and unacceptable error is introduced into measurements over only the said small portion of the total possible range of response of the system.

The present invention solves this problem, its concept being embodied in a system which employs an important part of the excellent concept in U.S. Pat. No. 3,385,108, and yet permits use of the entire ramp length of the sawtooth pulse for operating the gating switch even though the correction required by a change in the condition affecting flow measurement is only over a small part of the total possible range of such condition.

Stated generally, the invention solves the problem of correcting flow measurements when the change in a physical characteristic of a flowing mass which affects flow requires such correction, and when the actual variations of the conditions in the given system occur over only a small portion of the theoretically possible variation.

SUMMARY OF THE INVENTION

Accordingly, the principal object of the invention is to provide an improved system for the quantification of volumes or flow rates of a flowing mass. The attainment of this object includes sensing a change of a physical property affecting flow volume or rate over only a small preselected portion of the possible range over which the change can occur, and converting the signals proportional to the changes of the property within such preselected range to full (or expanded) range equivalents to affect volume or flow rate corrections due to such small changes.

The invention contemplates a system to correct flow rate or volume measurements to a selected reference or base condition by correcting for the effect of a physical condition in a given low order range of change of the condition, and includes a first transducer responsive to the flow of the fluid mixture and producing voltage pulses of a frequency proportional thereto, and a second transducer responsive to a physical condition of the flowing mass, such as temperature or pressure. The second transducer produces in known fashion an analog voltage of an amplitude proportional to such condition. The analog voltage is compared to a fixed-time-base voltage signal whose amplitude is directly proportional to time, and the voltage resultant of this comparison from a comparator circuit gates voltage pulses generated by the first transducer through a switch to a divider circuit. The divider circuit divides the quantity of pulses of the gated pulse train to produce the equivalent of a pulse train for an expanded range measurement. A subtractor circuit then combines the divider output pulses with the total pulse output of the first transducer to compensate for the effect on flow rate or volume of the change in the physical condition in question, and a suitable volume counter or flow rate indicator then registers the volume or rate of the flowing mass corrected for the change in the physical condition.

Other objects, advantages and features of this invention will become apparent to one skilled in the art upon consideration of the written specification, appended claims, and attached drawing, wherein;

The FIGURE is a diagrammatic representation of the elements of a system in which the present invention is embodied for manifesting the flow rate or volume of a flowing mass corrected for the effect of temperature or pressure.

DESCRIPTION OF THE PREFERRED EMBODIMENT

1. Plan of the Description

The FIGURE depicts a system for correcting flow measurements due to relatively small fluctuations of pressure or temperature of a flowing gas stream. Certain basic elements for effecting these measurements are disclosed in U.S. Pat. No. 3,385,108. Material therein which is essential to the disclosure of the present invention is hereby incorporated by reference.

It is stressed that the present invention is not limited merely to accurate correction of volume and flow rate measurements of gas streams in which small variations of pressure and/or temperature occur. Any combination of flowing fluids and physical properties thereof which properly actuate the two transducer elements can be measured by the invention.

However, though change in volume due to change in temperature and/or pressure of liquids, such as liquids containing dissolved and/or free gas, may be compensated by the invention, the common situation of a gas stream subject to temperature and/or pressure variations will be referred to in this description for simplicity and clarity.

When reference hereafter to a temperature and/or pressure condition in system of the embodiment is necessary, it will be discussed only as a temperature condition. All references to change in temperature will therefore be understood to include by implication a supplementary reference to change in pressure. The accommodation of either phenomenon by the system is identical in concept, though they exert opposite influences on volume (i.e., volume varies directly with temperature and inversely with pressure). Similarly, when further reference to flow rate and/or flow volume is required, a reference to flow volume alone will be understood to include a reference to flow rate. The terms are of equal consequence in the embodiments, and either may be manifest with equal facility by mere selection of a volume counter of flow rate counter as manifesting means.

2. The Description

In the FIGURE a gas stream flows through conduit 1. The gas flowing past a point in conduit 1, in reference units of standard cubic feet, is registered on counter 29. An accurate measure of this flow in some such reference units is the end result of the embodiment.

Turbine meter 4 is placed in conduit 1 as a transducer responsive to the gas flow. The magnetic pickup of meter 4 generates a pulse voltage at a frequency proportional to flow rate.

Amplifying network 5 amplifies the voltage pulses as required by the subsequent circuit elements. The amplified signal is applied at squarer 6 to shape the amplified pulse to a constant amplitude square wave.

The frequency of this signal remains proportional to flow rate. These pulses, initially generated by the meter 4, are to be gated through an electrical switch in dependence upon the analog signal from the capacitor circuitry, as explained below.

A thermometer element 30 is also placed in conduit 1 as a transducer responsive to the temperature of the gas stream. This element 30 and detector 31 comprise, in known fashion, the circuit in which an analog voltage output of temperature is developed.

The voltage analog of the thermometer-detector circuit is translated by converter 32 to a D.C. voltage of an amplitude compatible with the subsequent elements of the system. This analog D.C. voltage is applied as will be explained to control the diversion of voltage pulses produced by meter 4 through the switch to the counter 29.

A converter network 15 receives the square wave pulses of the meter and its associated circuits 5,6, and the analog D.C. from transducer 30-detector 31 and associated converter 32.

The analog to digital converter 15 consists of an electrical signal generator 15A, a comparator circuit 15B, and an electronic switch 15C. The generator produces periodically a fixed-time-base voltage whose amplitude is directly proportional to time, in a form commonly referred to as a linear sawtooth voltage. The D.C. voltage due to thermometer 30 is compared to the sawtooth voltage during the time duration of the time base of the sawtooth. Dependent upon this comparison, i.e. upon the time at which the sawtooth and probe voltages are equal, a comparator output is generated to operate the electrical switch. When the switch is closed, the pulses of meter 4 are applied at divider 25 for the remainder of the time duration of the fixed-time base of the sawtooth period. (When the comparator output is zero, the switch is open and the pulses are not transmitted beyond converter 15.)

Stated differently, the analog voltage is applied at the comparator; when the sawtooth voltage increases to a voltage equal to that of the analog, the comparator applies a voltage at the switch to close the switch; when the switch is closed, the pulses of the meter 4 are gated to a divider connected to the switch for a time equal to the remainder of the time of the sawtooth period during which the comparison was made. The sequence is then repeated during the next sawtooth pulse of the generator.

The number of meter pulses applied at divider 25 is dependent only upon the analog voltage due to temperature. For example, for a temperature deviation of the fluids in conduit 1 equal to 25 percent of full scale of the analog signal of the thermometer-detector circuit, the comparator voltage due to the comparison of the temperature analog voltage with the sawtooth causes the switch of converter 15 to close after 25 percent of the time of the sawtooth pulse has passed, if the temperature has increased, or after 75 percent of the time of the sawtooth if the temperature has decreased (the "zero" point for the reference temperature of 60° F. having been set at 50 percent of the sawtooth peak voltage).

A divider circuit 25 is connected to converter 15. The voltage pulses from the converter proportional to the temperature of the gas are reproduced in a fixed preselected percent as an output of the divider 25, such percent depending upon the dividing factor set into the divider.

The pulse output of divider 25 and the total output of meter 4 are now applied at a subtractor circuit 26. This circuit 26 may be of any well known form, such as a NAND gate device. Subtractor 26 cancels a number of the total meter 4 pulses equal to the number of pulses in the divider output. The output of subtractor 26 is thus the difference between meter 4 pulses and divider 25 pulses during the sawtooth time base. These pulses are then counted by a suitable counter 29 to register the volume of gas passing through conduit 1 corrected for a temperature deviation from the selected reference temperature.

As noted above, volume is directly proportional to temperature and inversely proportional to pressure. It is therefore apparent that in the system embodying the concept of the invention for compensating for temperature of the fluids in conduit 1, the higher the temperature, the lower must be the analog voltage, so that more pulses are gated by the switch. Likewise, in compensating for pressure, the higher the pressure in conduit 1, the higher must be the analog voltage, so that fewer pulses are gated by the switch.

An example will clarify understanding of the novel concept, as well as the operation of the embodiment. Presume a gas stream flowing in conduit 1 experiences, due to normal temperature variations, a maximum volume change of 10 percent (±5 percent). Presume also that the standard cubic foot (scf) is to be measured at the reference temperature of 60° F. When volume of the gas is "correct" in conduit 1, i.e., when temperature is 60° F., the temperature analog of thermometer 30 and associated circuitry 31,32 is set to equal the sawtooth pulse voltage at 50 percent of the sawtooth time base, i.e., when 50 percent of the time of one sawtooth pulse has expired. For reference purposes, it is thus noted that a flow of one scf produces exactly X pulses from meter 4 during the time base of the sawtooth, and that $0.50X$ pulses are gated to the divider when one scf passes meter 4.

Since the dividing factor for the given maximum volume change of 10 percent is 10 (any number $N/10 = 10\% \times N$), $0.05X$ pulses comprise the output of the divider at 60° F., and $X - 0.05X$, or $0.95X$ pulses comprise the output of the subtractor. The counter is thus calibrated so that $0.95X$ pulses register one scf at counter 29, i.e., so that the counter turns up "1" when $0.95X$ pulses issue from the subtractor. Similarly, if the given maximum volume change were only ±2.5 percent, a dividing factor of 20 would be set in divider 25 ($N/20=0.05\% \times N$) and, upon meter 4 producing $X$ pulses, $0.975X$ pulses exit the subtractor and will equal one unit in counter 29.

It is now seen that when the gas has a temperature above 60° F. (pressure constant) in the case of given 10 percent volume change, the apparent flow is greater than true flow, i.e., the meter will produce $X+$ pulses for one scf. Thus, the temperature analog from 30,31,32 is arranged to equal the sawtooth voltage at a lower value than it would at standard temperature conditions of 60° F. (and therefore before 50 percent of the time base has elapsed). This causes more pulses of meter 4 to be gated to the divider, and sufficiently more pulses to be subtracted at 26 from the $X+$ total pulses from the meter to insure that only $0.95X$ pulses are counted by counter 29 during the time the meter produces the $X+$ pulses.

The identical method is demonstrated when temperature in the conduit is less than 60° F. Apparent volume is less than volume at 60° F.; $X(-)$ pulses are produced by meter 4; the temperature analog is equal to sawtooth voltage after 50%+ of the time base has elapsed; fewer pulses are gated to the divider and subtracted from the total $X(-)$ output of meter 4; and $0.95X$ pulses are registered at counter 29 during the time meter 4 produces $X(-)$ pulses, so that one scf is registered.

The method is consistent when a temperature range of the gas always below a reference temperature such as 60° F., such as 20°–40° F., is given, or when a range always above the reference 60° F., such as 90°90 –110° F., is given. The volume change for the given temperature range is calculated, the divider set from the maximum volume change and the counter calibrated for a particular pulse count of meter 4 at a given reference temperature.

As stated above, the method is consistent when corrections for pressure are desired (temperature constant). Higher pressures than the standard pressure of one atmosphere cause meter 4 to produce less than $X$ number of pulses per scf. Thus the pressure analog must equal the sawtooth voltage at a point above the sawtooth voltage at a point above the sawtooth voltage reference value so that fewer pulses are subtracted from the meter output. The method of correcting volume measurements of lower pressure gas will be apparent from the above examples.

It is also obvious that the novel concept includes the correction of flow measurements where both temperature and pressure vary concurrently; both pressure and temperature probes could sense conditions in conduit 1, and an integrated analog be applied an converter 15.

It is again stressed that the embodiment can correct volumes or flow rates of liquids as well as gasses when such are affected by temperature and/or pressure variations.

The output from the subtractor circuit 26 is disclosed closed here as controlling the register 29. However, it is emphasized that the outputs from the subtractor circuit could control other means, such as computer circuits designed to receive and utilize information of flow conditions in conduit 1. The counter disclosed is only one example of a structure with which to manifest the measurement.

Detailed disclosure of the operation and circuitry of certain elements may be had by reference to U.S. Pat. No. 3,385,108. For ease of reference, numbering of similar structural elements in the subject application is consistent therewith. Reference is also directed to U.S. Pat. No. 3,385,108 for disclosure of certain circuit diagrams, or for further elaboration of the disclosure as to matters pertaining to the Figure, or as otherwise required for understanding of the specification as it relates to incorporation of matter of U.S. Pat. No. 3,385,108.

3. Summary.

The concept of the invention is to measure a physical condition, such as temperature and/or pressure, of a flowing fluid mass over a range which is only a small preselected, or given, portion of the total possible range, and then to convert electronically the measurements made over this small portion of the possible range to an equivalent of the possible range. In the example, the given range of actual volume change due to temperature was 10 percent, and the method of operation of the novel concept was demonstrated to adapt the prior art system which is capable of response to volume changes over a much greater range to the small 10 percent range.

The concept of the invention is thus seen functioning generally to solve the problem of error introduced in measuring such consistently small changes, and specifically to overcome the problem of inherent error introduced in such circumstances into the prior art system incorporated in the embodiment.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

I claim:

1. A system which manifests the flow of a flowing fluid stream, including,
    a first transducer producing a pulsed electrical signal at a pulse frequency proportional to the flow rate of the fluid mixture,
    a second transducer producing an analog electrical signal proportional to a selected physical condition of the flowing fluid,
    an electrical signal generator producing a linear sawtooth voltage over a selected time interval,
    a comparator circuit responsive to the signal output voltage of the second transducer and responsive to the linear sawtooth voltage which compares the second transducer and sawtooth voltages and produces a voltage to operate an electrical switch means in a selected position for a portion of the time interval of the sawtooth voltage,
    an electrical switching means connected to the comparator circuit and first transducer, and operative in response to the voltage output of the comparator circuit for gating the output pulses of the first transducer, a divider means connected to the switch for reproducing only a preselected percent of the first transducer pulses gated by the switch means, the percent being dependent upon a known range of change in volume of the flowing fluid stream due to changes in the selected physical condition,
    a subtractive circuit means connected to the divider and responsive to the pulsed output of the divider and the total pulse output of the first transducer for subtracting the output pulses of the divider from the output pulses of the first transducer, and
    a counter means connected to the subtractive circuit for counting the pulse output thereof, whereby the quantity of the fluid flowing across the first transducer is measured with respect to selected reference conditions.

2. The system of claim 1, in which,
the selected physical condition is temperature, and
the range of change in volume of the flowing fluid due to change in temperature is 10 percent or less.

3. The system of claim 2, in which,
the reference temperature of the flowing fluid is 60° F. and the flow is measured in standard cubic feet.

4. The system of claim 1, in which,
the selected physical condition is pressure, and
the range of change in volume of the flowing fluid due to change in pressure is 10 percent or less.

5. The system of claim 4, in which,
the reference pressure of the flowing fluid is one atmosphere and the flow is measured in standard cubic feet.

* * * * *